July 26, 1949. W. V. THELANDER 2,477,016
CLUTCH PLATE
Filed Dec. 18, 1944
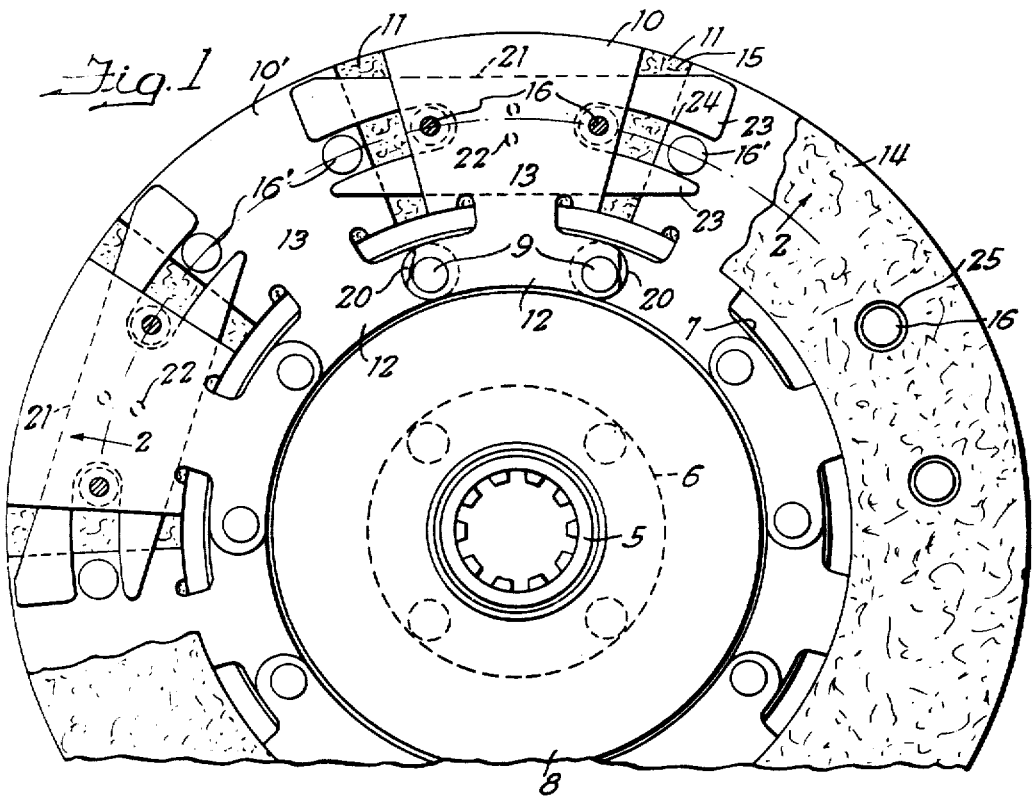
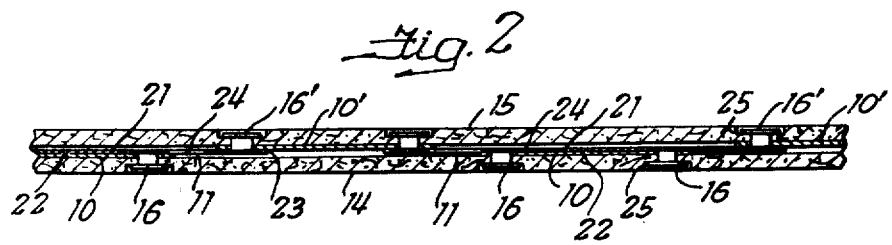
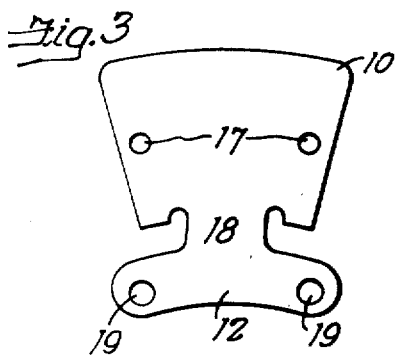 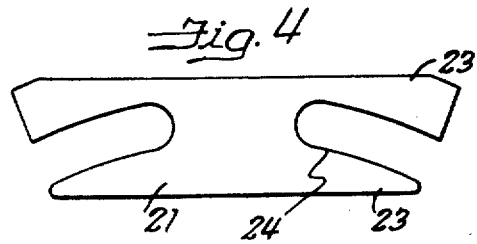
Inventor
W. Vincent Thelander Patented July 26, 1949

2,477,016

UNITED STATES PATENT OFFICE 2,477,016

CLUTCH PLATE

W. Vincent Thelander, Auburn, Ind., assignor to Dava Corporation, Toledo, Ohio, a corporation of Virginia Application December 18, 1944, Serial No. 568,664

18 Claims. (Cl. 192—107)

1

This invention relates to clutches generally and is more particularly concerned with improvements in automotive type friction clutches.

One of the principal objects of my invention consists in the provision of a clutch plate of sectional construction utilizing a number of small sheet metal stampings to build up the outer annular portion on which the annular facings are mounted, it being possible to produce these stampings with much less waste than is involved in the stamping of large disks, and it being also possible to produce these stampings from salvaged scrap material, so that the present structure is made available at a much lower cost than would otherwise be possible. The present clutch plate has been so designed that all of the sheet metal stampings carrying the annular facings are of identical form, thus further reducing the cost of manufacture and simplifying as well as speeding up assembling.

An important object of the invention consists in the provision of a clutch plate embodying an improved "mush" construction between the friction facings a salient feature of which lies in the provision of flat leaf-springs which can be produced to the desired uniformity at much lower cost than specially shaped leaf-springs and the use of which as compared with the conventional struck-out ears commonly provided as integral portions of clutch plates means an appreciable saving in cost by reason of the fact that it makes possible the use of ordinary sheet metal stampings for the plate proper instead of spring steel. In the present construction the sheet metal stampings on which the annular facings are mounted are arranged in two series, the circumferentially spaced stampings of one series carrying the flat leaf-springs being disposed in staggered relation to the circumferentially spaced stampings of the other series, and the flat leaf-springs overlap the last-mentioned stampings so as to be flexed when the plate is compacted between the pressure plate and flywheel. With the present construction there is no difficulty in obtaining clutch plates in quantity production of uniform thickness in the facing portion and with the facings in substantial parallelism throughout the circumference, whereas with the other earlier constructions mentioned, such uniformity in thickness and parallelim of facings was not obtained, and as a result such plates when installed would not give as good performance nor would they last as long as could otherwise be expected.

The invention is illustrated in the accompanying drawing, in which—

2

Fig. 1 is a rear view of a clutch plate made in accordance with my invention, showing a portion of the friction facing removed to better illustrate the mush construction of my invention;

Fig. 2 is a sectional detail on the arcuate line 2—2 of Fig. 1, and

Figs. 3 and 4 are detached views of one of the sheet metal stampings and one of the flat leaf-springs, respectively.

The same reference numerals are applied to corresponding parts throughout the views.

The clutch plate shown comprises relatively rotatable inner and outer portions, the inner portion being formed by a center hub 5 splined for driving connection with the driving shaft of an automotive transmission, and provided with an annular flange 6 onto which notched plates are riveted for oscillatory movement with the hub relative to a ring 7 that is notched in register with the notching of the aforesaid plates for cooperation with hydraulic piston and cylinder assemblies inside the housing 8, as disclosed, for example, in my Patent 2,337,135, issued December 21, 1943, the housing 8 having its opposite side plate riveted to the ring 7, as indicated at 9, and containing a heavy lubricating oil or grease as the working fluid for the piston and cylinder assemblies. Springs are also provided as a part of these piston and cylinder assemblies, as disclosed in the patent just mentioned, and in operation when relative movement takes place between the hub 5 and ring 7, that is to say between the inner and outer portions of the clutch plate, the springs of said assemblies are compressed to cushion the drive, and at the same time the heavy oil or grease with which the cylinders of said assemblies are filled is discharged to some extent through bleeder holes in the cylinders, so that a pumping action is obtained adding materially to the cushioning effect and accordingly relieving the cushioning springs of some of the load. The recoil action of the springs is also checked by this pumping action, because their return to normal extended condition is retarded as a result of the restriction of the bleeder holes through which the heavy oil or grease must flow. In that way the secondary vibrations are absorbed and a smooth drive is obtained.

The outer portion of the plate contains the mush construction with which my invention is particularly concerned. There are two series of sheet metal stampings 10 and 10', the circumferentially spaced stampings 10 of one series being in staggered relation to the circumferentially spaced stampings 10' of the other series, and the spaces between the stampings of each series being wider than the stampings, as is clearly indicated by the spaces 11 in Fig. 1, so that the stampings, which are secured to the housing 8 by the rivets 9 entered through registering holes in the overlapping ends of the attaching portions 12 of the stampings, are received in these spaces when the plate is compacted upon engagement of the clutch. That is to say, the stampings 10 and 10' in the compacting of the outer portion of the plate will have their outer segmental-shaped portions 13 brought more or less into coplanar relationship under pressure between the opposing drive faces of the flywheel and pressure plate in the engagement of the clutch. The friction facings or pads 14 and 15 are applied to the outer faces of the stampings 10 and 10' by rivets 16 and 16', respectively, the facing 14 being arranged for engagement by the pressure plate and the facing 15 for engagement with the flywheel. The stampings 10 and 10', as clearly appears in Figs. 1 and 3, are generally T-shaped, the large segmental-shaped portion 13, to which the facings are attached by the rivets 16 and 16' entered in the holes 17, forming the crossbar of the T and the attaching portion 12 the lower end of the stem portion 18 of the T. The rivets 9 for fastening the stampings are entered through holes 19 in the opposite ends of the attaching portion 12. The narrowness of the stem portion 18 in relation to the wide segmental-shaped outer end portion 13 gives the desired yield or flexibility in these stampings 10 and 10' to permit compacting of the outer portion of the plate in the manner described. Washers 20 are preferably interposed between the stampings 10 and 10', one at each rivet 9, so as to space the segmental-shaped outer portions 13 in parallel planes and leave room between the two planes of the stampings for flat leaf-springs 21, which are of approximately the same thickness as the washers 20, or less. There is one of these flat leaf-springs spot welded, or otherwise suitably secured, as indicated at 22, to each of the stampings 10 on the middle of the inner face of the segmental-shaped outer portion 13 thereof. Each of these flat leaf-springs is generally H-shaped, so as to provide two substantially parallel fingers 23 extending from each side of each segment 10 into overlapping relation with the adjacent radial edge portions of the next adjacent stampings 10'. The arcuate slots 24 which define the fingers 23 are struck with the center of the hub 5 as a center and at the proper radius with relation to the circle on which the rivets 16 and 16' are located, so that the heads of these rivets lie in these slots and there is, therefore, no problem or need of counter-sinking presented, the only place where the heads of these rivets must be counter-sunk being in the outer faces of the facings 14 and 15, as indicated at 25. There is, therefore, no interference with the "packing" tightly together of the parts in the engagement of the clutch.

In operation, it should be clear that when the pressure plate is moved toward the flywheel in the engagement of the clutch, the facings 14 and 15 are pressed together, thereby flexing the stampings 10 and 10' toward coplanar relationship and correspondingly flexing the fingers 23 of all of the leaf springs 21, the spring pressure of all of these leaf-springs tending to keep the facings 14 and 15 apart, insuring the desired smooth engagement of the clutch and avoiding grabbing. The leaf-springs 21 being normally flat will, of course, exert increasing spring pressure on the facings 14 and 15 as they approach fully engaged relationship, the outer portion of the clutch plate being tightly packed between the pressure plate and flywheel when the clutch is fully engaged. When the clutch is disengaged, the leaf-springs 21 return to the flat unflexed form and accordingly return the stampings 10 and 10' to their normal spaced parallel relationship. The fact that all of the leaf-springs 21 are flat, as distinguished from specially formed spring metal parts previously provided for mush purposes, makes for a clutch plate of uniform increased thickness in the disengaged condition and therefore obviates the objection common in many other clutch plate constructions of non-uniform engagement and accordingly non-uniform and rapid wear of the clutch plate facings and a tendency for the clutch to grab. In other words, flat leaf-springs like those shown at 21 can be produced to the desired uniformity, whereas specially shaped parts cannot be produced to a desired uniformity without difficulty, which means close rigorous inspection and a high percentage of rejections in quantity production of clutch plates. The fact that the stampings 10 and 10' are of identical form and are therefore interchangeable results in an appreciable saving in the cost of production and simplifies and expedites assembling. Also the fact that the present mush construction requires spring steel only in the leaf-springs 21 is, of course, an important factor from the economy standpoint. The present construction, particularly as a result of the use of the flat leaf-springs 21 and also to some extent as a result of the use of identical-shaped stampings throughout, insures close uniformity as to thickness of plates throughout their circumference in quantity production.

It is believed the foregoing description conveys a good understanding of the objects and advantages of my invention. The appended claims have been drawn to cover all legitimate modifications and adaptations.

I claim:

1. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted in slightly axially spaced relation to one another on the hub to turn therewith and projecting radially therefrom, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, and leaf springs disposed in overlapping relationship to and between the plate sections of the two series to resist compacting thereof.

2. In a device of the character described, a hub, two parallel series of plate sections concentrically arranged relative to the axis of said hub and mounted on the hub to turn therewith, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, and leaf springs interposed between said plate sections to resist the compacting thereof.

3. In a device of the character described, a hub, two parallel series of plate sections concentrically arranged relative to the axis of said hub and mounted on the hub to turn therewith, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, and flat leaf springs disposed in approximate parallelism with the plate sections of the two series and between said series and supported on the plate sections of the one series in overlapping relation to the plate sections of the other series so as to be flexed between the plate sections of the two series to resist compacting thereof.

4. In a device of the character described, a hub, two parallel series of plate sections concentrically arranged relative to the axis of said hub and mounted on the hub to turn therewith, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, flat leaf springs disposed in approximate parallelism with the plate sections of the two series and between said series and supported on the plate sections of the one series in overlapping relation to the plate sections of the other series so as to be flexed between the plate sections of the two series to resist compacting thereof, rings of friction facing material abutting the outer faces of said plate sections, and rivets extending through each of said rings and the plates of the associated series to fasten the rings to said plates, said rivets having the heads on the inner ends thereof clear of the leaf springs and of a thickness no greater than the thickness of said leaf springs so as not to interfere with close compacting of the plate sections.

5. In a device of the character described, a hub, two parallel series of plate sections concentrically arranged relative to the axis of said hub and mounted on the hub to turn therewith, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, flat leaf springs disposed in approximate parallelism with the plate sections of the two series and between said series and supported on the plate sections of the one series in overlapping relation to the plate sections of the other series so as to be flexed between the plate sections of the two series to resist compacting thereof, rings of friction facing material abutting the outer faces of said plate sections, said leaf springs having slots provided therein, and rivets extending through each of said rings and the plates of the associated series to fasten the rings to said plates, said rivets having the heads on the inner ends thereof disposed in the slots in said leaf springs and of a thickness no greater than the thickness of said leaf springs so as not to interfere with close compacting of the plate sections.

6. In a friction clutch driven plate, a mounting hub portion of relatively heavy sheet metal, and a peripheral portion comprising two parallel series of structurally independent plate sections of readily distortable, thin, resilient sheet metal concentrically arranged relative to the axis of said hub and mounted in slightly axially spaced relation to one another on the hub to turn therewith and projecting radially therefrom, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, friction facing material annularly applied to the outer faces of said plate sections, and spring means in the space between the plate sections and engaging the inner faces thereof to resist compacting of the plate sections.

7. In a device of the character described, a hub, two parallel series of plate sections concentrically arranged relative to the axis of said hub and mounted on the hub to turn therewith, the plate sections of both series being generally T-shaped with the crossbar portions radially outermost relative to the hub, and the relatively narrow stem portions projecting radially from the hub and readily distortable with respect thereto in the compacting of the plate sections, the plate sections of both series being circumferentially spaced and the plate sections of one series being in staggered relation to the plate sections of the other series and arranged to fit freely in the spaces between the plate sections of said other series, whereby the two series of plate sections are adapted to be compacted into substantially coplanar relationship, and leaf springs mounted on the radially outer portions of the plate sections of one series in overlapping relation to the radially outer portions of the other plate sections to resist compacting of the plate sections.

8. A device as set forth in claim 7, wherein the leaf springs are generally H-shaped whereby to provide two pairs of spring fingers radially spaced with respect to the plate sections, the device including friction facing material applied to the outer faces of the plate sections, and rivets for fastening said facing material to said plate sections, the rivets having the heads on the inner ends thereof lying between the fingers of said leaf springs and of a thickness no greater than the thickness of said leaf springs so as not to interfere with close compacting of the plate sections.

9. A device as set forth in claim 7, wherein the T-shaped plate sections of both series are of substantially identical size and shape and, therefore, interchangeable, the radially inner ends of the stem portions of said plate sections being enlarged transversely to provide elongated attaching portions, the plate sections being arranged with the ends of the attaching portions of the plate sections of the one series in overlapping relation to the ends of the attaching portions of the plate sections of the other series, whereby fastening means may be entered through said overlapped portions to secure the plate sections to the hub.

10. A device as set forth in claim 7, wherein the

T-shaped plate sections of both series are of substantially identical size and shape and, therefore, interchangeable, the radially inner ends of the stem portions of said plate sections being enlarged transversely to provide elongated attaching portions, the plate sections being arranged with the ends of the attaching portions of the plate sections of the one series in overlapping relation to the ends of the attaching portions of the plate sections of the other series, whereby fastening means may be entered through said overlapped portions to secure the plate sections to the hub, the device including spacer washers inserted between said overlapping portions to space the plate sections of one series axially with respect to the plate sections of the other series approximately the equivalent of the thickness of the leaf springs.

11. In a friction clutch driven plate, the combination of two substantially parallel axially spaced series of plate portions in concentric relation to one another, the plate portions of both series being circumferentially spaced and the plate portions of one series being disposed in staggered relation to the plate portions of the other series and adapted to fit freely in the spaces between the plate portions of said other series, whereby the two series of plate portions are adapted to be compacted into substantially coplanar relationship, and leaf springs interposed in the space between said plate portions to resist the compacting thereof.

12. In a friction clutch driven plate, the combination of two substantially parallel axially spaced series of plate portions in concentric relation to one another, the plate portions of both series being circumferentially spaced and the plate portions of one series being disposed in staggered relation to the plate portions of the other series and adapted to fit freely in the spaces between the plate portions of said other series, whereby the two series of plate portions are adapted to be compacted into substantially coplanar relationship, and flat leaf springs disposed in approximate parallelism with the plate portions of the two series and between said series and supported on the plate portions of the one series so as to be flexed between the plate portions of the two series to resist compacting thereof.

13. In a friction clutch driven plate, the combination of two substantially parallel axially spaced series of plate portions in concentric relation to one another, the plate portions of both series being circumferentially spaced and the plate portions of one series being disposed in staggered relation to the plate portions of the other series and adapted to fit freely in the spaces between the plate portions of said other series, whereby the two series of plate portions are adapted to be compacted into substantially coplanar relationship, flat leaf springs disposed in approximate parallelism with the plate portions of the two series and between said series and supported on the plate portions of the one series so as to be flexed between the plate portions of the two series to resist compacting thereof, rings of friction facing material abutting the outer faces of said plate portions, and rivets extending through each of said rings and the plate portions of the associated series to fasten the rings to said plate portions, said rivets having the heads on the inner ends thereof disposed clear of the leaf springs and of a thickness no greater than the thickness of said leaf springs so as not to interfere with close compacting of the plate portions.

14. In a friction clutch driven plate, the combination of two substantially parallel series of plate portions in concentric relation to one another, the plate portions of both series being generally T-shaped with the crossbar portions of the T's radially outermost and with the relatively narrow stem portions of the T's extending substantially radially inwardly with respect to the crossbar portions, said stem portions being more readily distortable to facilitate compacting of the plate portions, the plate portions of both series being circumferentially spaced and the plate portions of one series being disposed in staggered relation to the plate portions of the other series and adapted to fit freely in the spaces between the plate portions of said other series, whereby the two series of plate portions are adapted to be compacted into substantially coplanar relationship, and leaf springs mounted on the crossbar portions of the plate portions of one series in overlapping relation to the other plate portions to resist compacting of the plate portions.

15. A friction clutch driven plate as set forth in claim 14, including friction facing material abutting the outer faces of the plate portions of the two series, and rivets fastening said facing material to said plate portions, said rivets having heads on the inner ends thereof disposed clear of the leaf springs and of a thickness no greater than the thickness of said leaf springs, whereby to permit close compacting of the plate portions.

16. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual sheet metal friction-facing supports carried by said mounting means and extending in a generally radial direction and of equal radial length and attached to one friction facing only, each of said supports having a circumferentially extending outer end portion disposed between said facings, which outer end portion has flexible end regions, and other friction facing supports carried by said mounting means and extending in a generally radial direction and of the same radial length as the first mentioned supports but attached only to said other friction facing and disposed in circumferentially spaced relation so as to be located in the spaces between the first-mentioned supports, said other friction facing supports also having outer end portions disposed between said friction facings, the latter outer end portions engaging the flexible end regions on the first-mentioned supports to effect flexing thereof yieldingly to resist axial movement of one friction facing toward the other friction facing under clutch packing pressure.

17. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual sheet metal friction-facing supports carried by said mounting means and extending in a generally radial direction and of equal radial length and attached to one friction facing only, each of said supports having an outer end portion disposed between said friction facings and a substantially flat leaf spring elongated in a direction circumferentially of the facings and disposed in transverse abutting relation with the outer end portion of each of said supports and having flexible end portions projecting circumferentially from opposite sides of said supports, and other friction facing supports carried by said mounting means and extending in a generally radial direction and of the same radial length as the first mentioned supports but attached only to said other friction facing and disposed in circumferentially spaced relation so as to be located in the spaces between the first-mentioned supports, the latter friction facing supports having their outer end portions disposed between said friction facings and engageable with the flexible end portions of said leaf springs to effect flexing thereof yieldingly to resist axial movement of one friction facing toward the other friction facing under clutch packing pressure.

18. A friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual sheet metal friction-facing supports carried by said mounting means and extending in a generally radial direction and of equal radial length and attached to one friction facing only, each of said supports having an outer end portion disposed between said friction facings and a substantially flat leaf spring elongated in a direction circumferentially of the facings and disposed in transverse abutting relation with the outer end portion of each of said supports and having a flexible end portion projecting from the support in a circumferential direction between said friction facings, and other friction facing supports carried by said mounting means and extending in a generally radial direction and of the same radial length as the first mentioned supports but attached only to said other friction facing and disposed in circumferentially spaced relation so as to be located in the spaces between the first-mentioned supports, the latter friction facing supports having their outer end portions disposed between said friction facings and engageable with the flexible end portions of said leaf springs to effect flexing therof yieldingly to resist axial movement of one friction facing toward the other friction facing under clutch packing pressure.

W. VINCENT THELANDER.

REFERENCES CITED

The following references are of record in the file of this patent:

UNITED STATES PATENTS

| Number | Name | Date |
| --- | --- | --- |
| 2,027,650 | Nutt | Jan. 14, 1936 |
| 2,316,820 | Thelander | Apr. 20, 1943 |
| 2,318,620 | Nutt | May 11, 1943 |
| 2,333,308 | Goodwin | Nov. 2, 1943 |
| 2,339,430 | Saks | Jan. 18, 1944 |
| 2,380,835 | Goodwin | July 31, 1945 |